United States Patent
Hoffmann

(10) Patent No.: US 7,192,641 B2
(45) Date of Patent: Mar. 20, 2007

(54) STAMPING FILM, METHOD FOR THE PRODUCTION THEREOF AND FOR TRANSFERRING A LABEL FROM SAID STAMPING FILM TO A SUBSTRATE

(75) Inventor: Lars Hoffmann, Freising (DE)

(73) Assignee: Giesecke & Devrient GmbH, Munich (DE)

(*) Notice: Subject to any disclaimer, the term of this patent is extended or adjusted under 35 U.S.C. 154(b) by 362 days.

(21) Appl. No.: 10/467,068

(22) PCT Filed: Feb. 26, 2002

(86) PCT No.: PCT/EP02/02038

§ 371 (c)(1),
(2), (4) Date: Dec. 24, 2003

(87) PCT Pub. No.: WO02/083430

PCT Pub. Date: Oct. 24, 2002

(65) Prior Publication Data
US 2004/0091681 A1 May 13, 2004

(30) Foreign Application Priority Data
Feb. 28, 2001 (DE) .................. 101 09 519

(51) Int. Cl.
*B44C 1/165* (2006.01)

(52) U.S. Cl. ............... 428/349; 428/353; 156/233; 156/234; 156/240

(58) Field of Classification Search ............... 156/234, 156/233, 240; 428/353, 344, 347, 349
See application file for complete search history.

(56) References Cited

U.S. PATENT DOCUMENTS

| | | | | |
|---|---|---|---|---|
| 4,211,809 A | * | 7/1980 | Barta | 428/201 |
| 4,728,377 A | * | 3/1988 | Gallagher | 156/58 |
| 4,837,072 A | | 6/1989 | Kraetschmer | |
| 5,731,064 A | * | 3/1998 | Suss | 428/195.1 |
| 6,531,016 B1 | * | 3/2003 | Weber et al. | 156/230 |
| 2001/0007702 A1 | * | 7/2001 | Otten et al. | 428/40.1 |

FOREIGN PATENT DOCUMENTS

| | | |
|---|---|---|
| EP | 0 195 857 A | 10/1986 |
| GB | 1 568 563 | 6/1980 |

* cited by examiner

*Primary Examiner*—Richard Crispino
*Assistant Examiner*—Barbara J. Musser
(74) *Attorney, Agent, or Firm*—Bacon & Thomas, PLLC

(57) ABSTRACT

An embossing foil (100) for transferring labels (2) to documents of value (1) includes at least a carrier foil (10), a label layer (20) and an adhesion promoter layer (30). The dimensions of the adhesion promoter layer (30) are limited to the contour of the labels (2) to be transferred from the embossing foil (100).

15 Claims, 2 Drawing Sheets

STAMPING FILM, METHOD FOR THE PRODUCTION THEREOF AND FOR TRANSFERRING A LABEL FROM SAID STAMPING FILM TO A SUBSTRATE

BACKGROUND OF THE INVENTION

A. Field

This invention relates to the field of application of the labels to any substrates, in particular optically variable security elements, such as holograms, to papers of value, such as bank notes. The invention relates specifically to a method for producing an embossing foil suitable therefor, a corresponding embossing foil and a method for transferring labels from said embossing foil to a substrate.

B. Related Art

Applying labels to papers of value or any other objects serves to protect products since the labels have special authenticity features that are difficult to forge, such as holographic diffraction structures. For applying the labels to the particular substrates, numerous methods have been proposed that have in common transferring the labels from a transfer foil to the substrate surface by an embossing die, usually a hot stamping die, whereby the transfer foil is regularly not transferred at the same time.

BRIEF SUMMARY OF THE INVENTION

The basic structure of an embossing foil suitable therefor is described in DE 26 49 479 B2 according to which a hot stamping foil consists of a carrier foil to which at least one usually transparent lacquer layer is applied. Diffraction structures in the form of a three-dimensional relief pattern are then incorporated in the surface of said lacquer layer by means of an engraved cylinder. The thus embossed layer is covered with a thin metal layer to make the visual, diffractively acting, e.g. holographic, effect more distinctly visible. To permit a diffraction structure thus produced on the embossing foil to be transferred to the substrate by the hot stamping method, the metal layer is provided with an adhesive layer or heat seal layer. The adhesive layer of the hot stamping foil is then contacted with the substrate surface and its crosslinking induced by means of a hot stamping die from the back of the carrier foil. The adhesive produces between the substrate and the lacquer layer covered with the metal layer a firm bond that is more stable than the adhesive forces acting between the carrier foil and the lacquer layer. This effect can be additionally strengthened by providing between the carrier foil and the lacquer layer a separation layer that facilitates detachment of the layers from the carrier foil. Additionally, an adhesion promoter layer can be provided between the lacquer layer covered with the metal layer and the adhesive layer to improve the bond between adhesive layer and metal layer or substrate and label layers. As soon as the adhesive layer is sufficiently crosslinked or dried, the carrier foil can be removed, whereby the label layers remain on the substrate in the area of the activated adhesive layer. The form of the hot stamping die activating the adhesive layer thus determines the outline of the label transferred from the embossing foil.

There are different alternatives to this method, so that an ordinary laminating cylinder can be used for example instead of a specially formed embossing die. In such cases the adhesive layer is arranged so that only the desired area of the lacquer layer is transferred to the substrate. Thus, it is proposed for example in WO 96/01187 to apply the adhesive layer to the hot stamping foil already in the accordingly structured label form, whereby the lacquer layer can additionally be provided on the carrier foil in a precise fit with the structured adhesive layer for better contouring of the labels.

In contrast, WO 93/05124 and WO 92/20533 propose applying the adhesive layer directly to the substrate in the desired label form.

A further alternative is proposed in WO 93/16888 by which the adhesive layer is applied all over to the lacquer layer of the hot stamping foil, but the areas of said adhesive layer not to be transferred to the substrate are deactivated before the application step by being accordingly masked with a fast drying resin ink.

However, all aforementioned methods have the disadvantage that the hot-melt adhesive layer is softened during transfer by the supply of heat to make it adhesive, causing structured adhesive layers to spread in the edge area thereof and unstructured, locally heated adhesive layers to soften beyond the edge area of the local heating, so that in both cases the transferred label lacks sharp contours.

A method by which sharply contoured labels can be transferred from a carrier foil to a substrate is described in DE 44 11 404. Therein, labels are produced directly on the carrier foil exactly in the later desired outline form. However, such an embossing foil is hard to wind onto storage rolls and therefore troublesome to handle.

DE 41 30 896 A1 describes another way of transferring clearly contoured labels to the substrate. Here, the labels to be transferred are punched out while still located on the carrier foil, without the carrier foil being damaged, and the areas of the label layer not to be transferred are removed from the carrier foil before the transfer process. This method is expensive in terms of machinery.

The problem of the present invention is therefore to propose an easily handled embossing foil that makes it possible to transfer sharply contoured hologram labels to a substrate, in particular a bank note, without any special machinery expense.

A further problem of the invention is to propose corresponding methods for producing such an embossing foil and for transferring a label from such an embossing foil to a substrate.

In contrast to the prior art, the invention provides for structuring the label form by disposing an adhesion promoter layer in certain areas between the adhesive layer and the lacquer layer optionally provided with a metal layer. That is, the adhesion promoter layer is limited spatially to the dimensions of the single labels to be detached from the label layer. The term "label layer" stands here for the layer structure of a security element disposed continuously on a carrier layer. Said label layer preferably involves the conventional layer structure of an embossed hologram. The invention can of course also be used for any other embossing foils from which structured labels with a predetermined outline contour are transferred to a substrate.

The idea underlying the invention is to use bond forces of different strength between the adhesive layer and the label layer, on the one hand, and the adhesive layer and the adhesion promoter layer, on the other hand, as a point of break for exact-edge label application, because the adhesion between adhesive layer and adhesion promoter layer is higher than the adhesion between adhesive layer and directly adjoining label layer. Moreover, the bond between carrier foil and label layers is stronger than between adhesive layer and label layers. In this way, only the areas of the label layers provided with the adhesion promoter layer adhere to the substrate even when the adhesive layer is activated all over. All other areas are removed with the carrier foil.

To be more independent in the choice of adhesive layer material, an alternative embodiment of the invention provides for filling the areas of the label layer not bearing the inventive adhesion promoter layer with a separation layer. This supports the effect that a firm bond with the adhesive layer arises only in the area of the adhesion promoter layer, and moreover facilitates handling of the embossing foil since the layer thickness of the embossing foil can thus be designed to be uniform.

The adhesive layer need not necessarily be part of the embossing foil. It can also, or if needed also only additionally, be applied directly to the substrate. Furthermore, the adhesive layer can be limited to the specific areas of the labels to be transferred.

As explained above, the transfer of labels from the inventive embossing foil does not require an exactly contoured embossing die. The embossing die, which is preferably formed as a hot stamping die, should only have a greater surface than the surface of the label to be transferred. In the projecting area of the die, no firm bond occurs during the application process between the label layer and the adhesive layer or, in the case of the aforementioned alternative embodiment of the invention, between separation layer and adhesive layer. Due to the weight of the substrate firmly adhering to the label layer to be transferred in the area of the adhesion promoter layer, the label layer tears along the outside edge of the adhesion promoter. Thus, only the desired motif area of the label layer is applied to the substrate, whereas the label layer outside the desired motif area remains on the carrier foil and is wound onto a waste roll with the carrier foil.

To achieve an easier tear, it may be expedient in some circumstances to make lacquer layers present in the label layer structure, such as an embossed lacquer layer, thinner outside the structured motif area than in the motif area. To achieve easier detachment of the label from the carrier foil, an additional separation layer can further be provided between carrier foil and label layer.

The inventive embossing foil is simple to produce and easy to handle. It can in particular be readily wound onto large storage rolls, in particular when all layers except the adhesion promoter layer are applied to the carrier layer all over. The fluctuations in thickness of the adhesion promoter layer do not cause any problems during winding since it constitutes only 1 to 3.5 percent of the total embossing foil thickness. When the areas between the adhesion promoter layer applied only in certain areas are filled with a separation layer, there are actually no fluctuations in thickness. In the other case, the fluctuations in thickness are partly compensated by the adhesive layer if the adhesive layer is part of the embossing foil and not applied directly to the substrate.

DESCRIPTION OF THE DRAWINGS

In the following, the invention will be described by way of example with reference to the Figure, in which.

DETAILED DESCRIPTION OF THE PREFERRED EMBODIMENT(S)

Figure 1:
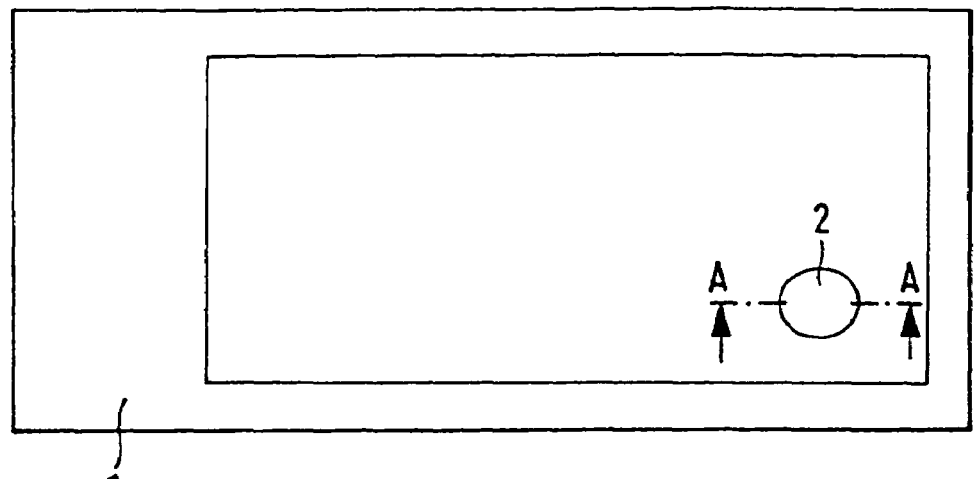
FIG. 1 shows a bank note with an applied label in a top view.
Figure 2:
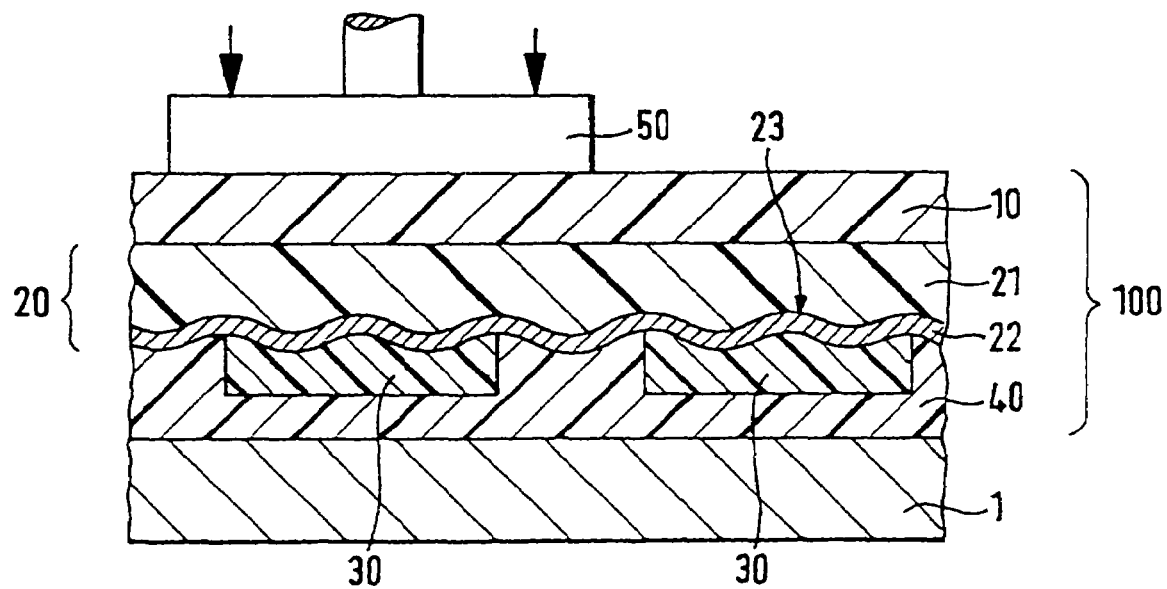
FIG. 2 shows a cross section through an inventive embossing foil according to a first embodiment.

FIG. 1 shows bank note 1 with label 2 applied thereto. FIG. 2 shows in cross section hot stamping foil 100 from which label 2 is detached and transferred to bank note 1. The embossing foil is constructed as follows.

Carrier foil 10 bears label layer 20. Label layer 20 comprises transparent lacquer layer 21 embossed on one side, and metal layer 22 covering the embossed surface of lacquer layer 21. The embossed surface of lacquer layer 21 is formed as special three-dimensional relief 23 and acts as an optically variable, for example holographic, diffraction structure whose optical impression is strengthened by metal layer 22. Label layer 20 is provided all over with hot-melt adhesive layer 40, with adhesion promoter layer 30 being provided in partial areas between label layer 20 and hot-melt adhesive layer 40.

The bond forces acting between adhesion promoter layer 30 and adhesive layer 40, on the one hand, and adhesion promoter layer 30 and the label layer, on the other hand, are high compared to the bond forces between label layer 20 and adhesive layer 40.

The contour of adhesion promoter layer 30 is selected here in accordance with label 2 to be transferred.

The carrier foil preferably has a thickness of 10 to 40 microns. Metalized lacquer layer applied all over consists preferably of a UV-curable lacquer and preferably has a thickness of about 2 to 5 microns. Adhesion promoter layer 30 has a thickness of about 0.5 to 1.5 microns. And hot-melt adhesive layer 40 applied all over preferably has a thickness of about 3 to 7 microns.

For applying single label 2 to bank note 1 or the endless bank note paper, adhesive layer 40 of embossing foil 100 is contacted with the surface of bank note 1. Hot stamping die 50 transfers pressure and temperature to hot-melt adhesive layer 40 from the back of hot stamping foil 100 via carrier foil 10 and label layer 20. This causes the heated area of hot-melt adhesive 40 to first change to a liquid state and penetrate partly into the surface of the bank note. After curing of the adhesive there is a firm bond between the bank note and label layer 20 in the area of the adhesion promoter layer. Preferably, the surface of hot stamping die 50 is formed somewhat greater than the individual areas of adhesion promoter layer 30 and protrudes accordingly beyond the outer contour of the areas of adhesion promoter layer 30, as shown in FIG. 2.

The firm bond between the bank note and the corresponding area of adhesion promoter layer 30 produced by the curing of activated adhesive layer 40, and the firm bond between adhesion promoter layer 30 and label layer 20, cause embossed lacquer layer 21 with thin metal layer 22 to tear off along the outside edge of adhesion promoter 30 when carrier foil 10 is removed from bank note 1.

Figure 3:
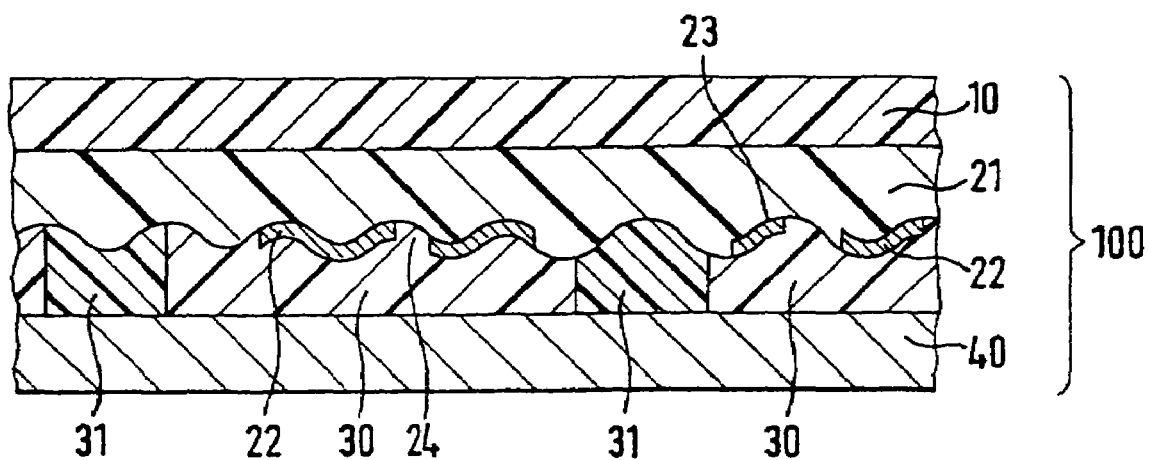
FIG. 3 shows a cross section through an inventive embossing foil according to a second embodiment.

However, the tear of embossed lacquer layer 21 with metal layer 22 presupposes that the bond between adhesive layer 40 likewise activated in the edge area of adhesion promoter layer 30 is substantially weaker than in the area of adhesion promoter layer 30. If this precondition is not given due to the adhesive material used, it is advantageous to fill the spaces between the individual areas of adhesion promoter layer 30 with separating agent material forming separation layer 31, as shown in FIG. 3. Instead of an embossing die, a continuously working web-fed embossing machine can also be used, since the label layer is transferred to the substrate according to the invention only in the areas provided with the adhesion promoter layer.

The embodiment of the invention shown in FIG. 3 differs from the embodiment shown in FIG. 2 in addition by the following two features, which can be realized just the same individually or jointly in the embodiment according to FIG. 2 in corresponding fashion.

Thus, metal layer 22 is not provided on lacquer layer 21 all over but only in those areas that are part of the label to be transferred. Said areas are completely covered by adhesion promoter layer 30, so that metal layer 22 is completely protected from environmental influences.

In addition, it is provided in the embodiment according to FIG. 3 that metal layer 22 has gaps 24 that can represent characters, patterns or the like. Bank note 1 or the bank note material is not shown here.

Figure 4:
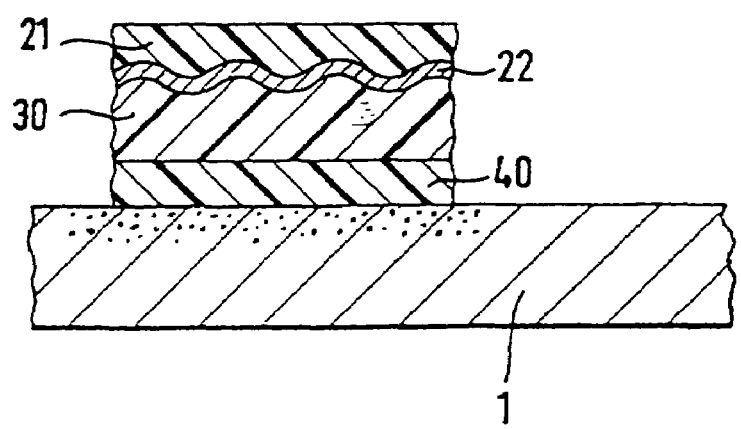
FIG. 4 shows a cross section through a bank note with applied labels.

FIG. 4 shows bank note 1 shown in FIG. 1 in cross section along A—A, the transferred label having layer structure 20 shown in FIG. 2. Transfer foil 10 of hot stamping foil 100 shown in FIG. 2 was removed after transfer of label 2 and wound onto a waste roll with the components of the embossing foil not transferred. In addition, it can be seen, shown by dots, that adhesive components of adhesive layer 40 have penetrated into the surface of bank note 1, also in the area outside the outer contour of adhesion promoter layer 30.

The invention claimed is:

1. An embossing foil comprising:
   a carrier foil;
   a label layer on the carrier foil from which single labels are detachable, said label layer comprising a lacquer layer provided with diffraction structures in the form of a relief;
   an adhesion promoter layer on the label layer enabling production of a stable bond between the label layer and an adhesive layer the adhesive layer applied on the adhesion promoter layer;
   wherein the adhesion promoter layer is provided on the label layer in spaced-apart areas;
   wherein the adhesive layer covers all the adhesion promoter layer and covers areas of the label layer located therebetween; and
   wherein the adhesion promoter layer is limited spatially to the dimensions of the single labels later to be detached.

2. The embossing foil according to claim 1, wherein the adhesive layer partially covers at least the adhesion promoter layer.

3. The embossing foil according to claim 1, including a separation layer filling in the areas between the spaced apart areas of the adhesion promoter layer on the label layer.

4. The embossing foil according to claim 1, wherein the adhesive layer is a hot-melt adhesive layer.

5. The embossing foil according to claim 1, wherein the diffraction structures at least partially include a metalization.

6. The embossing foil according to claim 5, wherein the metalization includes gaps in the form of characters or patterns.

7. A method for producing an embossing foil with a label layer enabling later transfer of single labels from the label layer to a substrate comprising the following steps:
   providing a carrier foil with a label layer from which single labels are later to be detached, said label layer including a lacquer layer provided with diffraction structures in the form of a relief;
   applying an adhesion promoter layer to the label layer, said adhesion promoter layer selected so as to produce a stable bond between the label layer and an adhesive layer;
   applying the adhesive layer to the adhesion promoter layer;
   wherein the adhesion promoter layer is limited spatially to the dimensions of the single labels later to be detached; and
   wherein the adhesive layer is applied all over to the adhesion promoter layer and areas of the label layer located therebetween.

8. A method for transferring a label from an embossing foil to a substrate comprising the following steps:
   providing an embossing foil with a label layer from which single labels are subsequently detached, and an adhesion promoter layer applied to the label layer, the adhesion promoter layer being limited spatially to the dimensions of the single labels to be subsequently detached, the label layer comprising a lacquer layer provided with diffraction structures in the form of a relief;
   applying an adhesive layer to the adhesion promoter layer or to the substrate if the embossing foil is not already equipped with such an adhesive layer;
   contacting the embossing foil with the substrate in the area of the adhesive layer; and
   detaching a label from the label layer and transferring the label to the substrate in an embossing operation;
   wherein the adhesive layer is applied to the adhesion promoter layer;
   wherein the adhesive layer is applied all over to the adhesion promoter layer and areas of the label layer located therebetween.

9. The method according to claim 7 or 8, wherein the adhesive layer is applied partially and at least to the adhesion promoter layer.

10. The method according to claim 7 or 8, wherein areas located between the adhesion promoter layer applied to the label layer in spatially limited fashion are filled with a separation layer.

11. The method according to claim 8, wherein the adhesive layer comprises a hot-melt adhesive, and the embossing operation is effected by means of a hot stamping die whose die surface is greater than the dimensions of the label to be detached.

12. The method according to claim 7, wherein the diffraction structures are provided at least partially with a metalization.

13. The method according to claim 12, wherein the metalization includes gaps in the form of characters, or patterns.

14. A method for producing a document of value, comprising transferring a label to the document of value according to the method of claim 8 wherein, the document of value itself constitutes the substrate.

15. The method according to claim 14, wherein the document of value is a bank note.

* * * * *